(12) United States Patent
Mori et al.

(10) Patent No.: US 6,392,903 B2
(45) Date of Patent: May 21, 2002

(54) ELECTRONIC EQUIPMENT ADAPTED TO REDUCE POWER CONSUMPTION DURING NO OPERATION

(75) Inventors: Toshiharu Mori; Yoshio Tanabe, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/777,064

(22) Filed: Feb. 5, 2001

(30) Foreign Application Priority Data

Feb. 15, 2000 (JP) ........................................ 2000-041464

(51) Int. Cl.$^7$ ............................................. H02M 3/335
(52) U.S. Cl. ...................... 363/21.07; 363/100; 327/544
(58) Field of Search ................................ 363/20, 21.01, 363/21.04, 21.07, 21.12, 21.15, 84, 89, 100, 125; 200/238; 327/510, 540; 335/544, 27

(56) References Cited

U.S. PATENT DOCUMENTS 5,793,624 A * 8/1998 Couture et al. ................ 363/47
5,812,386 A * 9/1998 Youn ........................... 363/100
6,307,762 B1 * 10/2001 Shiobara ....................... 307/86

FOREIGN PATENT DOCUMENTS

JP 06-349139 12/1994

* cited by examiner

*Primary Examiner*—Adolf Deneke Berhane
*Assistant Examiner*—Gary L. Laxton
(74) *Attorney, Agent, or Firm*—Brinks Hofer Gilson & Lione (57) ABSTRACT

The present invention provides electronic equipment that can shut off and supply power to a primary power supplying circuit by automatic operations, directly shut off power to the primary power supplying circuit by easy manual operations based on the operator's will, and never fails to zero power consumption of the primary power supplying circuit during no use. The electronic equipment comprises: a primary circuit; a secondary power supplying circuit to which power is supplied from the primary circuit; a control circuit; a switch apparatus provided with a switch; and a capacitor, wherein the switch apparatus includes: an operation member for switching the switch between manual ON and OFF positions and an automatic ON/OFF position in which ON/OFF operations can be automatically performed; and a driving source for automatically operating the switch, wherein, in the automatic ON/OFF position, the driving source is driven by a signal from the control circuit or power supplied from the capacitor to automatically turn the switch ON or OFF, whereby power to the primary power supplying circuit can be automatically supplied or shut off, and wherein the operation member is manually operated to turn the switch ON or OFF, whereby power to the primary circuit can be manually supplied or shut off.

2 Claims, 4 Drawing Sheets

ELECTRONIC EQUIPMENT ADAPTED TO REDUCE POWER CONSUMPTION DURING NO OPERATION

BACKGROUND OF THE INVENTION

1. Field of the Invention

The present invention relates to electronic equipment such as videocassette recorders (VCR), televisions, and monitors, and more particularly to electronic equipment adapted to reduce power consumption (standby power) during no operation (no use).

2. Description of the Prior Art

A description will be made of conventional electronic equipment, e.g., a VCR apparatus. Most of VCR apparatuses include a receiving part (light receiving part) that receives electrical signals (e.g., light signals) corresponding to power ON/OFF operations (including various VCR operations) from a remote controller, and because of the need to perform light receiving and other processing for the automatic power ON/OFF operations by the remote controller, even when power to the electronic equipment is OFF, they keep a primary power supplying circuit ON at all times wherein part of a secondary power supplying circuit is kept connected to the primary power supplying circuit.

Therefore, even when the secondary power supplying circuit is OFF, power is supplied to the primary power supplying circuit at all times and a corresponding amount of power continues to be consumed, with the result that several watts of power are consumed even during no use (no operation).

Figure 6:
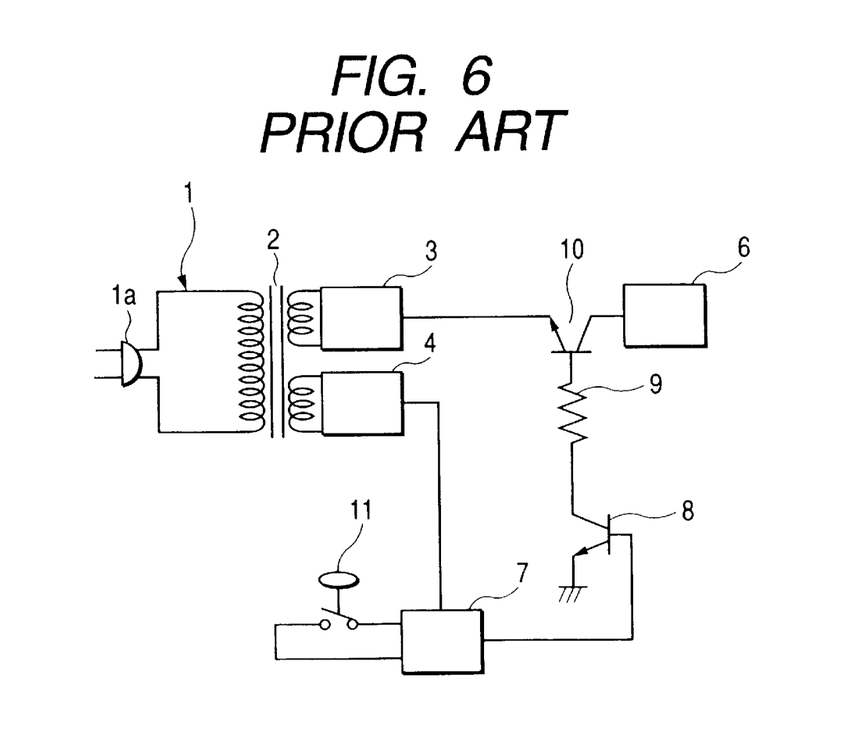
FIG. 6 is a schematic diagram showing main portions of a power control circuit of conventional electronic equipment.

A power control circuit of such a VCR apparatus, as shown in FIG. 6 by a schematic diagram showing main portions of the circuit, comprises: a primary power supplying circuit 1 to which 100 V AC is supplied from a power supplying terminal 1a; a power transformer 2; a signal and motor power circuit 3 and a control power circuit 4 making up a secondary power supplying circuit; a signal and motor circuit 6; a control circuit 7 comprising a microcomputer and other parts; a power control transistor 8; a resistor 9; a switching transistor 10; and an ON/OFF switch (DC switch) 11 for manually sending a signal for switching between an activation state and a standby state.

Power is supplied to this power control circuit; when power to the electronic equipment is ON, the ON/OFF switch 11 is turned OFF manually by an operator, or the power is automatically turned off by a remote controller; the control circuit 7 detects this event and sends a signal to the power control transistor 8 to turn the power off; thereby, the switching transistor 10 is turned off and power from the signal and motor power circuit 3 to the signal and motor circuit 6 is shut off; and the electronic equipment is shifted to a power OFF state.

In conventional electronic equipment, even when power is OFF, both the signal and motor power circuit 3 and the control power circuit 4 making up a secondary power supplying circuit are connected through the power transformer 2 with the primary power supplying circuit 1 to which 100 V AC is inputted. Therefore, there has been a problem in that power continues to be consumed as standby power by an amount corresponding to it.

When light such as noise passes through the light receiving part of the electronic equipment for some reason, power to the electronic equipment changes from OFF to ON against the operator's will, in which case power continues to be consumed. When a malfunction such as runaway occurs in the control circuit 7 for some reason, ON/OFF operations by the ON/OFF switch 11 or the remote controller could not be detected by the control circuit 7 and the electronic equipment might go out of control of power ON/OFF operations. If the primary power supplying circuit 1 is ON in such a case, power will continue to be consumed against the operator's will.

As described previously, when the control circuit 7 goes out of control, in the case of the conventional electronic equipment, the user had nothing to do but remove the power supplying terminal 1a from the electric outlet to stop power from being supplied to the primary power supplying circuit 1.

In common houses, however, electronic equipment such as televisions or VCRs is often placed near to a wall of a room, an outlet for plugging the power supplying terminal 1a is wired to the wall, and to remove the power supplying terminal 1a from the outlet, troublesomely, it has been necessary to move the electronic equipment placed close to the wall.

SUMMARY OF THE INVENTION

The present invention provides electronic equipment that can shut off and supply power to a primary power supplying circuit by automatic operations, directly shut off power to the primary power supplying circuit by easy manual operations based on the operator's will, and never fails to zero power consumption of the primary power supplying circuit during no use.

As a first embodiment for solving the above problem, electronic equipment of the present invention comprises: a primary power supplying circuit; a secondary power supplying circuit to which power is supplied from the primary power supplying circuit; a control circuit connected to the secondary power supplying circuit; a switch apparatus provided with a switch; and charge storage means connected between the control circuit and the switch apparatus, wherein the switch apparatus includes: an operation member for switching the switch between manual ON and OFF positions in which ON/OFF operations are manually performed, and an automatic ON/OFF position in which ON/OFF operations can be automatically performed; and a driving source for automatically operating the switch, wherein, in the automatic ON/OFF position, the driving source is driven by a signal from the control circuit or power supplied from the charge storage means to automatically turn the switch ON or OFF, whereby power to the primary power supplying circuit can be automatically supplied or shut off, and wherein the operation member is manually operated to turn the switch ON or OFF, whereby power to the primary power supplying circuit can be manually supplied or shut off.

Furthermore, as a second embodiment, the switch apparatus includes a driving member for turning the switch ON and OFF wherein the driving member is disposed so as to be freely engaged with and disengaged from the operation member; when the operation member is operated into the automatic ON/OFF position, the driving member is disengaged from the operation member so that the switch can be automatically turned ON and OFF by driving the driving member by the driving source; and when the operation member is operated into the manual ON or OFF position, the driving member is engaged with the operation member and is directly operated by the operation member to keep the switch ON or OFF and restrain the driving of the driving member by the driving source.

BRIEF DESCRIPTION OF THE DRAWINGS

Preferred embodiments of the present invention will be described in detail based on the followings, wherein.

DESCRIPTION OF THE PREFERRED EMBODIMENTS

Hereinafter, embodiments of electronic equipment of the present invention will be described with reference to the accompanying drawings.

Figure 1:
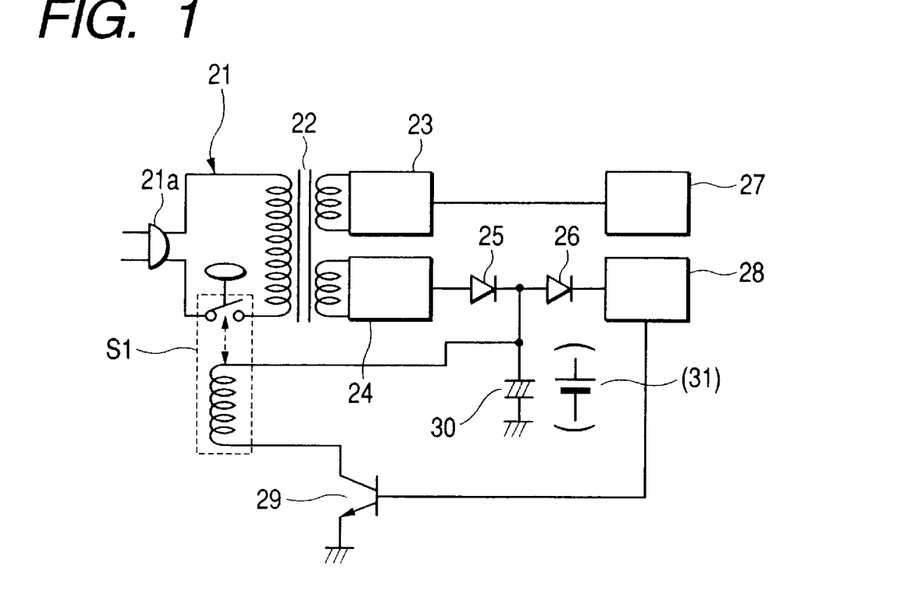
FIG. 1 is a schematic diagram showing main portions of a power control circuit of electronic equipment of a first embodiment of the present invention.
Figure 2:
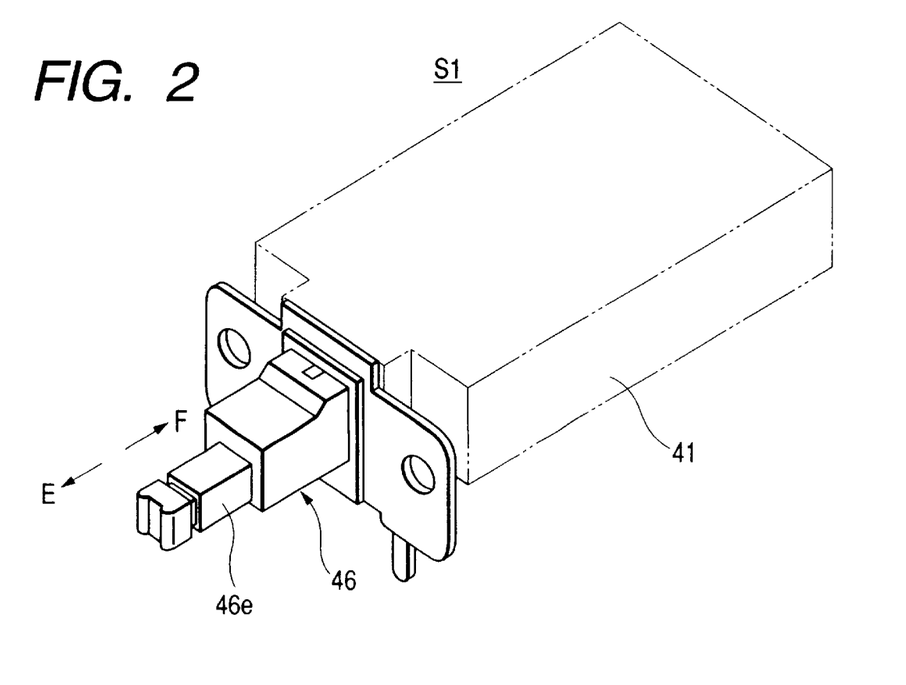
FIG. 2 is a perspective view of part of a switch apparatus S1 according to the electronic equipment of the first embodiment of the present invention.
Figure 3:
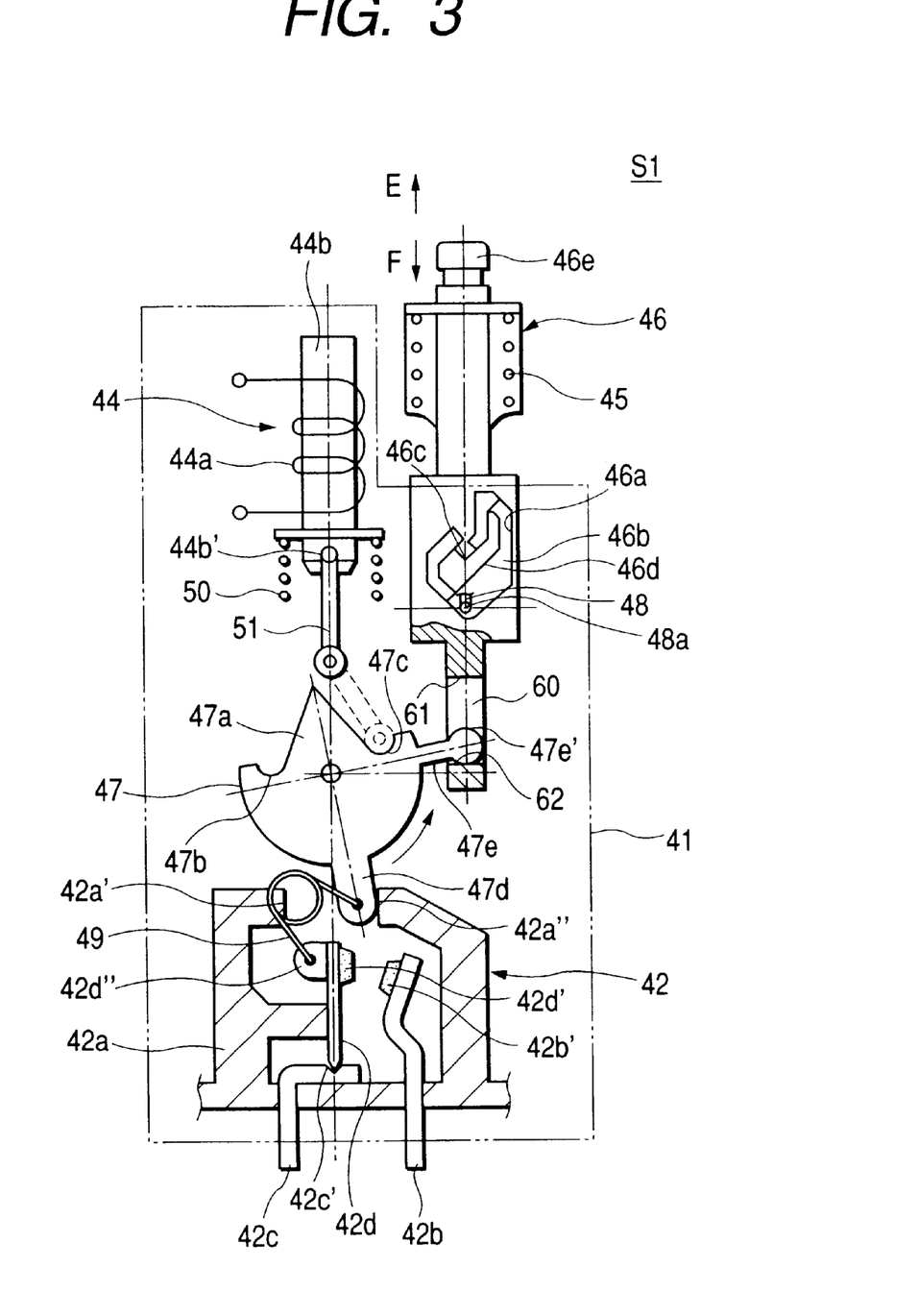
FIG. 3 illustrates the configuration of the switch apparatus S1 according to the electronic equipment of the first embodiment of the present invention.
Figure 4A:
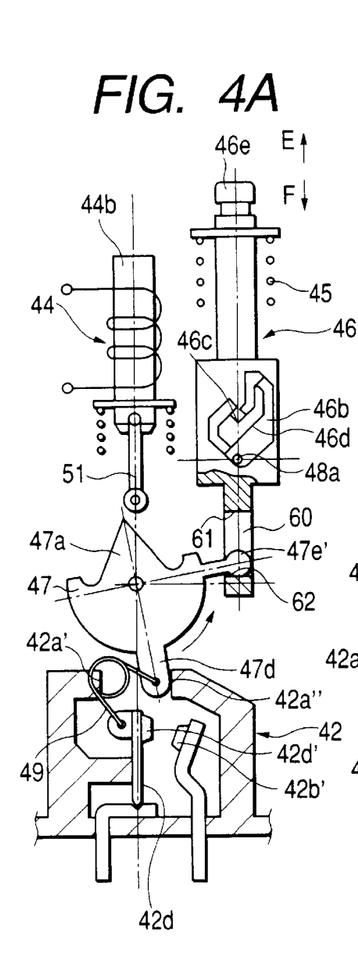
FIGS. 4A–4D illustrate the operation of the switch apparatus S1 according to the electronic equipment of the first embodiment of the present invention.
Figure 4B:
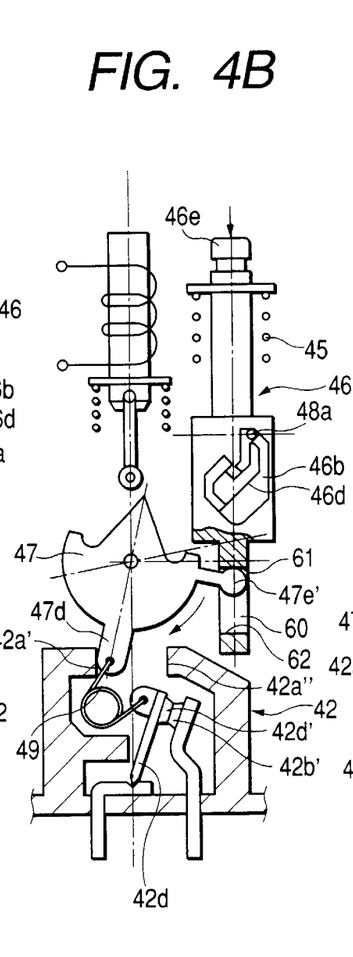
Figure 4C:
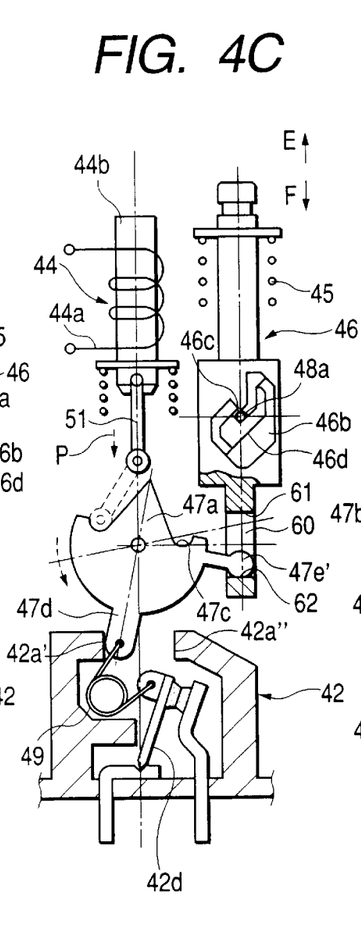
Figure 4D:
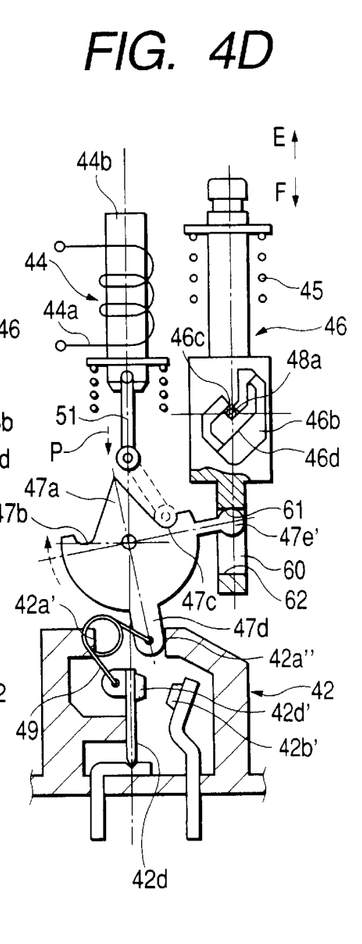

FIG. 1 is a schematic diagram showing main portions of a power control circuit of electronic equipment of a first embodiment of the present invention; FIG. 2 is a perspective view of part of a switch apparatus S1; FIG. 3 illustrates the configuration of the switch apparatus S1; FIG. 4A illustrates the switch apparatus S1 when manually turned off; FIG. 4B illustrates the switch apparatus S1 when manually turned on; FIG. 4C illustrates the switch apparatus S1 when automatically turned on; and FIG. 4D illustrates the switch apparatus S1 when automatically turned off.

On the assumption that electronic equipment of the present invention is, e.g., a videocassette recorder (VCR), a power control circuit of the VCR will be described.

Such a power control circuit, as shown in the schematic diagram of the main portions of FIG. 1, comprises a primary power supply circuit 21 (hereinafter referred to as a primary circuit 21) to which 100 V AC is supplied from a power supply terminal 21a, a switch apparatus S1 disposed in the primary circuit 21, and a secondary power supply circuit comprising a signal and motor power supply circuit 23 and a control power circuit 24 to which power supplied to the primary circuit 21 is supplied through a power transformer 22.

The signal and motor power supply circuit 23 is connected to a signal and motor power supply circuit 27, and a control power circuit 24 is connected through backflow prevention diodes 25 and 26 to a control circuit 28 and the switch apparatus S1, to each of which power is supplied from the control circuit 24. Also, the control circuit 28 and the switch apparatus S1 are connected through a driving transistor 29, and between the control circuit 28 and the switch apparatus S1, a charge storage means comprising a capacitor 30, secondary battery 31, or the like is provided, thus forming the power control circuit of the electronic equipment of the present invention.

The switch apparatus S1 connected to the primary circuit 21 is provided with a frame 41 made of a iron plate or the like as shown in FIGS. 2 and 3, in which a switch 42 and a driving source 44 are provided. The driving source 44, which comprises a solenoid as shown in FIG. 3, has a coil 44a and a plunger 44b and drives a driving member 47 by placing the plunger 44b into operation.

The plunger 44b, as shown in FIG. 3, is always resiliently energized by a spring 50 unidirectionally in the direction of the arrow E. At a lower end of the plunger 44b is provided an actuator 51 rotating about a fulcrum 44b'. The actuator 51 is always resiliently energized by a resilient member not shown so that it is positioned in the directions of the arrows E and F in the drawing (almost coaxial with the plunger 44b). When a current is supplied to the coil 44a and the driving source 44 is excited, the plunger 44b is driven by a magnetic force downward in the drawing against the resilience of the coil spring 50.

The switch 42, as shown in FIG. 3, includes an insulating case 42a, a fixing terminal 42b having one end thereof fixed through the bottom of the insulating case 42a and another end thereof bent in the shape of an L character, an L-shaped common terminal 42c, and a movable plate 42d. The lower end of the movable plate 42d is fitted in a concave portion 42c' formed on the upper surface of the common terminal 42c, and the movable plate 42d is rotatable with the lower end thereof as a fulcrum.

A fixed contact 42b' is convexedly formed in an L-shaped upper portion of the fixing terminal 42b, and a movable contact 42d' is convexedly formed in opposed relation to the fixed contact 42b' in an upper portion of the movable plate 42d. A spring anchoring part 42d" is formed on a surface of the movable plate 42d, opposite to the movable contact 42d'. When the movable plate 42d rotates and the movable contact 42d' contacts the fixed contact 42b', the fixing terminal 42b and the common terminal 42c are brought into conduction so that the switch 42 goes on.

An operation member 46 capable of switching between manual ON and OFF positions for manual ON/OFF operations, and automatic ON and OFF positions for automatic ON/OFF operations is disposed in the frame 41, and an operation shaft 46e projecting to the left and outwardly from the frame 41 in FIG. 2 is formed integrally with the operation member 46.

The operation member 46, as shown in FIG. 3, is always resiliently energized by the coil spring 45 unidirectionally in the direction of the arrow E. Although details are given later, when the operation shaft 46e is in the farthest position in the direction of the arrow E, the switch 42 of the switch apparatus S1 is in the initial state of OFF. When the operation member 46 is manually pushed all the way in the direction of the arrow F until it stops, the switch 42 goes ON.

The operation member 46 has a concave cam portion 46a as shown in FIG. 3 formed with a predetermined depth, and the concave cam portion 46a has a cam bottom 46b on which plural flat surfaces of different depths and oblique surfaces for linking the flat surfaces are formed. At a nearly central portion of the cam bottom 46b is projectingly formed a heart cam part 46d (part painted in black) having a lock wall 46c. The heart cam part 46d is formed in a shape in which a cam portion to the right in the drawing is elongated upwardly, and in line with the shape of the heart cam part 46d, the cam bottom 46b also has a portion to the right in the drawing elongated upwardly. The lock wall 46c is formed above the heart cam part 46d in FIG. 3.

A locking member 48 for anchoring the operation member 46 in a locked state comprises a metallic rod each end of which is formed bent at almost right angles in a same direction, a locking part 48a being formed at one end of the metallic rod and a swing fulcrum (not shown) being formed at another end.

In the locking member 48, the tip of the locking part 48a is on the cam bottom 46b of the operation member 46 and slides on the cam bottom 46b as the operation member 46 reciprocates in the directions of the arrows E and F, and the locking part 48a is disposed so that it can swing counterclockwise in the vicinity of the heart cam part 46d with the swing fulcrum (not shown) pivoted to the frame 41 as center.

A long cavity 60 is formed through the lower end of the operation member 46 and a pair of walls 61 and 62 are provided sandwiching a vacancy in the direction of operation of the operation member 46. On the other hand, the driving member 47, disposed within the frame 41, as shown in FIG. 3, in an upper portion of the drawing, has a mountain-shaped cam part 47a and concave parts 47b and 47c formed at both feet of the cam part 47a, and in a lower portion of the drawing, has a switch operation part 47d formed projectingly wherein one end of a reversing spring 49 comprising a twisted coil spring engages with the switch operation part 47d. Moreover, the driving member 47 has a lever part 47e formed projectingly to the right of the drawing wherein the lever part 47e has an arc-shaped engaging part, that is, a pushing part 47e' at a tip part thereof. The driving member 47, with a fulcrum at a nearly central position thereof, is rotatably supported within the frame 41. The rotation of the driving member 47 is limited to a range in which the switch operation part 47d can move between the walls 42a' and 42a" formed in an upper portion of the insulating case 42a.

The operation part 47e of the driving member 47 is loosely fitted within the long cavity 60 of the operation member 46. One end of the reversing spring 49 is anchored to the switch operation part 47d of the driving member 47, and another end of the reversing spring 49 is anchored to a spring anchoring part 42d" of the movable plate 42d, whereby the reversing spring 49 is secured to the driving member 47 and the movable plate 42d. The pair of walls 61 and 62 may be provided sandwiching a vacancy within the operation member 46; for example, they may be formed by two projections.

Next, referring to FIG. 4, the operation of the switch apparatus S1 is described.

In the initial state (the switch 42 of the switch apparatus S1 is OFF), that is, when the operation member 46 is in a manual OFF position, as shown in FIG. 4A, the operation member 46 is resiliently energized in the direction of the arrow E and the operation shaft 46e is in the farthest position in the direction of the arrow E, at which time the operation member 46 is in non-locked state.

The locking member 48 (see FIG. 3) when the operation member 46 is in non-locked state, as shown in FIG. 4A, has the locking member 48a disengaged from the lock wall 46c of the heart cam part 46d and positioned on the cam bottom 46b. At this time, the pushing part 47e' of the driving part 47 is pushed upward by the wall 62 of the long cavity 60 of the operation member 46, with the result that the driving member 47 is rotated counterclockwise and the driving member 47 is held with the switch operation part 47d of the driving member 47 abutting the wall 42a" of the insulating case 42a.

Moreover, in this state, since the upper end of the movable plate 42d is energized counterclockwise by the resilience of the reversing spring 49, the movable contact 42d' is off the fixed contact 42b', indicating that the switch 42 is OFF. In the initial state, the driving source 44 is in non-excited state and the plunger 44b is not driven by the driving source 44. Even if the plunger 44b is driven in the initial state, the driving member 47 is engaged with the operation member 46 and the switch 42 is forcibly turned OFF, the driving member 47 is not driven by the driven plunger 44b.

In this way, when the operation member 46 is in the manual OFF position, the switch 42 can be turned OFF without fail without accepting automatic ON/OFF operations on the switch 42.

Next, when the operation member 46 is manually operated in the direction of the arrow F in the initial state (FIG. 4A), the locking part 48a of the locking member 48 swings counterclockwise on the cam bottom 46b. As shown in FIG. 4B, as the operation member 46 moves in the direction of the arrow F, the locking member 48a moves at a long stroke along an upwardly elongated portion of the heart cam part 46d as shown to the right of the drawing and stops in the position where it abuts a wall at the upper right edge of the cam bottom 46b in the drawing. At this time, the operation member 46 reaches the manual ON position when it is deepest pushed in the direction of the arrow F.

In accordance with the pushing operation on the operation member 46 as shown in FIG. 4B in the initial state shown in FIG. 4A, the pushing part 47e' of the driving member 47 is downwardly pushed by the wall 61 of the long cavity 60 of the operation member 46 and the driving member 47 is rotated clockwise and is held with the switch operation part 47d of the driving member 47 abutting the wall 42a' of the insulating case 42a.

By this operation, at a predetermined position of a section in which one end of the reversing spring 49 anchored to the switch operation part 47d moves from the wall 42a" to the wall 42a', the reversing spring 49 is downwardly reversed, the upper end of the movable part 42d is reversed clockwise, and the movable contact 42d' abuts the fixed contact 42b', turning the switch 42 ON.

In this way, when the operation member 46 is in the manual ON position, the switch 42 can be turned ON without fail without accepting automatic ON/OFF operations on the switch 42.

Upon removal of the pressure applied in the direction of the arrow F after the operation member 46 is deepest pushed in the direction of the arrow F, the operation member 46 is returned by the amount of overstroke by the resilience of the coil spring 45, and as shown in FIG. 4C, the locking part 48a is positioned at the locking wall 46c of the heart cam part 46d, and the operation member 46 is anchored in locked state, thus positioned at the automatic ON/OFF position.

In this state, the wall 61 of the long cavity 60 of the operation member 46 moves upwardly away from the pushing part 47e' of the driving member 47, the driving member 47 is disengaged from the operation member 46, and the pushing part 47e' is positioned in the vicinity of the wall 62 of the long cavity 60. At this time, the wall 62 of the long cavity 60 maintains a positional relationship with the lock wall 46c so that it does not push the pushing part 47e'. The driving member 47 holds the state after the reversal operation in FIG. 4B by the action of the reversing spring 49 and the switch 42 remains ON.

At this time, the pushing part 47e' of the driving member 47 can rotate freely in a vacancy sandwiched between the walls 62 and 61 placed in opposed relation with each other in the long cavity 60 of the operation member 46.

Next, upon driving the driving source 44 by supplying current to the coil 44a to move the plunger 44b in the direction of the arrow P shown in FIG. 4C, after the tip of the actuator 51 mounted in the plunger 44b abuts the left oblique surface of the cam part 47a of the driving member 47, it moves along the oblique surface against the resilience of a resilient member (not shown). The tip of the actuator 51 engages in and pushes the concave part 47b formed in the driving member 47, whereby the driving member 47 is rotated counterclockwise, the reversal of the reversing spring 49 causes the switch operation part 47d to move from the wall 42a' until it abuts the wall 42a" as shown in FIG. 4D, and the actuator 51 is returned to the initial position by the coil spring 50.

At this time, the reversing spring 49 is reversed from a lower position as shown in FIG. 4C to an upper position as shown in FIG. 4D, whereby the upper end of the movable plate 42d is energized counterclockwise and the movable plate 42 is reversed in the same direction, and the movable contact 42d' holds the state in which it is off the fixed contact 42b', so that the switch 42 goes OFF.

Next, by supplying current to the coil 44a in the state of FIG. 4D to move the plunger 44b in the direction of the arrow P, after the tip of the actuator 51 abuts the right oblique surface of the cam part 47a of the driving member 47, it moves along the oblique surface. The tip of the actuator 51 engages in and pushes the concave part 47c formed in the driving member 47, whereby the driving member 47 is rotated clockwise, the reversal of the reversing spring 49 causes the switch operation part 47d to move from the wall 42a" until it abuts the wall 42a', and the switch 42 can be held ON again as shown in FIG. 4c.

In this way, when the operation member 46 is in the automatic ON/OFF position, by placing the plunger 44b into operation by exciting the driving source 44 to drive the driving member 47 independently of the operation member 46, the states of FIGS. 4C and 4D, that is, the ON/OFF states of the switch 42 can be automatically switched. Since a driving force required to drive the driving member 47 is independent of the magnitude of an operation force against the coil spring 45 of the operation member 46 and may be a minimum driving force required to turn the switch 42 ON/OFF, required power supplied to the driving source 44 can be minimized.

Next, as shown in FIGS. 4C and 4D, when the operation member 46 is manually operated in the direction of the arrow F in the state in which it is in the automatic ON/OFF position, the locking part 48a of the locking member 48 disengages from the locking wall 46c and moves in a short stroke to the upper right portion of the cam bottom 46b in the drawing, and stops in the position in which it abuts the wall at the upper end, and the operation member 46 is freed from the locked state and is unlocked. Although this operation causes the wall 61 of the long cavity 60 to slightly push the pushing part 47e' to rotate the driving member 47, since the amount of rotation is too small to reverse the reverse spring 49, the switch 42 will not change to an ON state.

Upon removal of the applied pressure, the operation member 46 moves in the direction of the arrow E by the action of the coil spring 45, the locking member 48a swings counterclockwise on the cam bottom 46b and is positioned in the position shown in FIG. 4A, and the operation member 46 returns to the initial state, the manual OFF position shown in FIG. 4A.

With this construction, when the operation member 46 is manually turned OFF in the automatic ON/OFF position shown in FIGS. 4C and 4D, the switch 42 can be manually turned OFF without passing through the automatic ON position shown in FIG. 4C. Therefore, where the switch 42 is OFF in the automatic ON/OFF position, the inconvenience that the switch 42 is temporarily turned ON before going OFF can be obviated, so that operations can be performed without a sense of incongruity.

At this time, when the driving member 47 is in the state of FIG. 4C, the pushing part 47e' of the driving member 47 is upwardly pushed by the wall 62 of the long cavity 60 of the operation member 46 and thereby the driving member 47 is rotated counterclockwise, while at a predetermined position of a section in which one end of the reversing spring 49 anchored to the switch operation part 47d moves from the wall 42a' to the wall 42a", the reversing spring 49 is upwardly reversed, the upper end of the movable part 42d is energized counterclockwise, and the movable plate 42 is rotated in the same direction, so that the movable contact 42d' moves away from the fixed contact 42b' and the switch 42 is turned OFF.

In this way, when the operation member 46 is in the automatic ON/OFF position shown in FIGS. 4C and 4D, the switch apparatus S1 can turn the switch 42 ON or OFF by the driving member 47 driven by the driving source 44, and when the operation member 46 is manually operated to directly turn the switch 42 OFF, subsequently, the switch 42 cannot be automatically turned ON or OFF by the driving source 44. Therefore, the switch apparatus S1 can be held OFF without fail.

Electronic equipment of the present invention is configured so that the switch 42 of the switch apparatus S1 is turned ON or OFF as described in FIG. 4, whereby the primary circuit 21 shown in FIG. 1 is turned ON or OFF.

At the point when a user purchases electronic equipment of the present invention, since the switch apparatus S1 of the primary circuit 21 is in the initial state as shown in FIG. 4A, when the user plugs the power supplying terminal 21a in an electric outlet (not shown) power is not supplied to the primary circuit 21.

Since the switch apparatus S1 does not accept, in the initial state, automatic ON/OFF operations as described above, even if a power ON signal is inputted to a light receiving part of the electronic equipment for some reason regardless of user's will, the switch apparatus S1 does not go ON and the electronic equipment never fails to keep the power OFF.

The primary circuit 21 can be triggered in such a way that the user manually operates the operation shaft 46e of the switch apparatus S1, and pushes the operation member 46 as far as it will go, in the direction of the arrow F, as shown in FIG. 4B, at which time the switch 42 of the switch apparatus S1 is turned ON.

When the primary circuit 21 is turned ON, direct-current power converted in the control power circuit 24 through the power transformer 22 is supplied to the secondary power supplying circuit and is supplied to the control circuit 28 through the backflow prevention diodes 25 and 26. Through the power transformer 22, power is supplied from the signal and motor power circuit 23 to the signal and motor circuit 27, and the electronic equipment of the present invention is powered ON.

When the primary circuit 21 is triggered and power is supplied to the control circuit 28, the control circuit 28 controls the overall electronic equipment and performs various control operations such as detecting various user input operations and controlling parts of the electronic equipment as required, or starting the automatic recording of reserved programs according to program recording reservation data beforehand inputted to a storage area of a memory (not shown) as required.

At this time, power from the control power circuit 24 is supplied to the capacitor 30 also, which is always charged to a given voltage or higher. Even when the switch 42 of the switch apparatus S1 is turned OFF and the power of the primary circuit 21 and the secondary power supplying circuit is stopped, since the control circuit 28 is always supplied with power from the capacitor 30, the control circuit 28 can detect remote control signals and other signals from the outside.

On the other hand, in the state in which the power to the electronic equipment is turned ON (the switch apparatus S1 is in the state of FIG. 4C), if a power OFF signal is inputted by a user remote control operation or the like, the control circuit 28 detects it; the driving transistor 29 is turned ON; the driving source 44 of the switch apparatus S1 operates; the driving member 47 is automatically operated; as shown in FIG. 4D, the switch 42 of the switch apparatus S1 is turned OFF; and the supply of AC power to the primary circuit 21 is automatically shut off, while the supply of power to the secondary power supplying circuits such as the signal and motor power circuit 23 and the control power circuit 24 through the power transformer 22 is shut off.

In this way, when power to the primary circuit 21 is shut off, the supply of power to the electronic equipment of the present invention is stopped and the primary circuit 21 consumes no power, contributing to eliminating conventional consumption of standby power.

In the automatic ON/OFF position shown in FIG. 4, when the switch 42 is OFF and the primary circuit 21 is turned OFF (state of FIG. 4D), on detecting an ON signal by a remote control operation or the like from the outside, the control circuit 28 to which power is supplied from the capacitor 30 drives the driving source 44 of the switch apparatus S1 through the driving transistor 29; the driving member 47 is automatically operated; as shown in FIG. 4C, the switch 42 of the switch apparatus S1 is turned ON; and power is supplied to the primary circuit 21.

Power is supplied through the power transformer 22 from the signal and motor power circuit 23 and the control power circuit 24 of the secondary power supplying circuit to parts, and the power to the electronic equipment is turned ON. The control circuit 28 can start the recording of reserved programs at a specified time and perform the operation of parts such as video tape rewinding, quick feeding, and the like by user's remote control operations from the outside. At this time, the capacitor 30 is supplied with power from the control power circuit 24 so that it is charged by a required quantity.

Next, referring to FIG. 5, a second embodiment of the present invention will be described.

Figure 5:
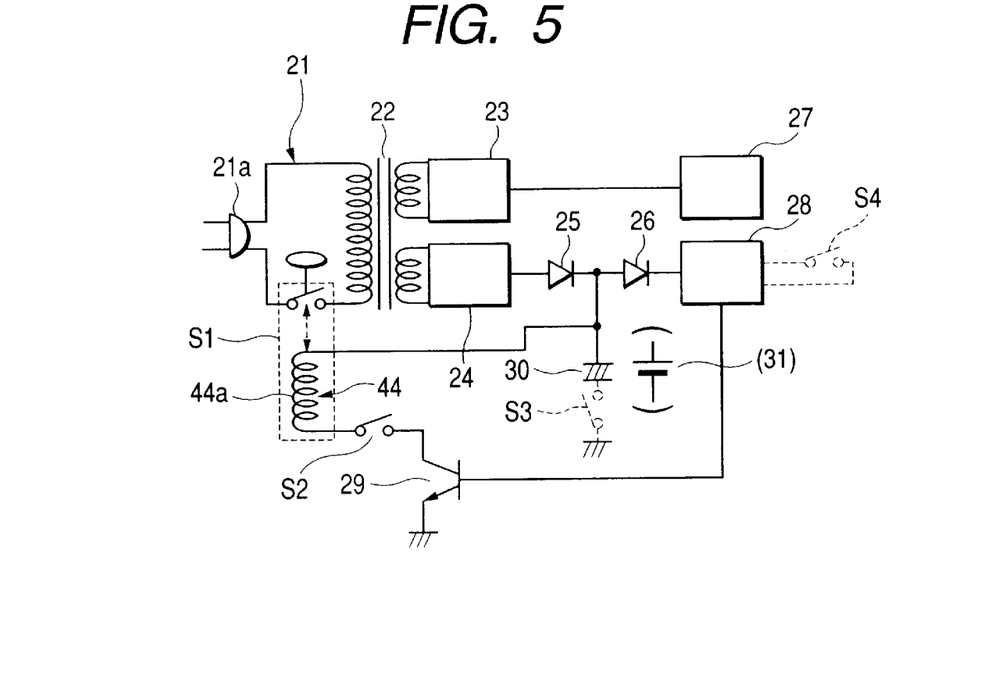
FIG. 5 is a schematic diagram showing main portions of the power control circuit of the electronic equipment of the second to fourth embodiments of the present invention.

FIG. 5 is a schematic diagram showing main portions of a power control circuit of electronic equipment of second to fourth embodiments of the present invention. It is understood that components described in these embodiments that are identical to components described in the first embodiment are identified by the same reference numbers.

In the manual OFF state (initial state) in the first embodiment, if automatic operations by a remote controller or the like are repeated performed during a short period of time, the driving source 44 (solenoid) is driven and the capacitor 30 (see FIG. 1) used as a charge storage means may be wastefully discharged.

Accordingly, in the second embodiment, a detection switch S2 is provided which detects whether the operation member 46 is in a lock position (automatic ON/OFF position) and according to whether the detection switch S2 is opened or closed, conduction to the coil 44a (see FIG. 3) in the initial state (manual OFF state) of the switch apparatus S1 is shut off not to actuate the driving source 44.

To be more specific, in this embodiment, the above-described detection switch S2, for example, as shown in FIG. 5, is connected in series between one end of the coil 44a and the collector of the driving transistor 29, in order that it may be connected in series between the driving source 44 and the control circuit 28.

With this construction, when it is detected by the detection switch S2 that the operation member 46 is in the initial state, by putting the detection switch S2 into an open state, even if an automatic operation is performed by a remote controller or the like, conduction to the coil 44a can be shut off not to actuate the driving source 44. This prevents charge storage means such as the capacitor 30 from being wastefully discharged in the initial state of the switch apparatus S1, enabling more efficient use of the charge storage means.

Alternatively, with the detection switch S2 disposed within the switch apparatus S1, when the operation member 46 is operated into the initial state (manual OFF state), the detection switch S2 maybe switched to an open state in conjunction with the operation member 46 to shut off conduction to the coil 44a. In this case, the detection switch S2 need not be disposed discretely in the electronic equipment, so that the above-described effect is obtained without increasing the number of parts of the electronic equipment.

As a third embodiment, instead of the detection switch S2 of the second embodiment, a detection switch S3, for example, as shown in FIG. 5, is connected in series between the capacitor 30 and the ground, in order that it may be connected with a charge storage means such as the capacitor 30. With this construction, when it is detected by the detection switch S3 that the operation member 46 is in the initial state, the detection switch S3 is put into an open state.

In this case, conduction to the driving source 44 is shut off as in the second embodiment, and power is not supplied to the control circuit 28 connected to the capacitor 30, providing the effect that power consumption of the charge storage means can be further reduced. At this time, signals from a remote controller or the like are not received in the control circuit 28.

Also in this embodiment, with the detection switch S3 disposed within the switch apparatus S1, when the operation member 46 is operated into the initial state (manual OFF state), the detection switch S3 maybe switched to an open state in conjunction with the operation member 46 to shut off conduction to the coil 44a. Also in this case, the same effect as in the second embodiment is obtained.

As a fourth embodiment, instead of the detection switches S2 and S3 in the second and third embodiments, a detection switch S4 is disposed in the control circuit 28 as shown in FIG. 5, and it is detected based on a signal from the detection switch 4 that the operation member 46 is in the initial state, at which time a receiving part (light receiving part) to receive automatic operation signals from a remote controller or the like is adapted not to function.

In this embodiment, the same effect as in the second embodiment is obtained. Where the control circuit 28 shown in FIG. 5 is connected with a control circuit or other circuits of other electronic equipment to send or receive signals, when it is detected that the operation member 46 of the switch apparatus S1 in the electronic equipment is in the initial state, the control circuit 28 controls the other electronic equipment also; for example, it can turn the power to the other electronic equipment OFF. Thus, when other equipment is connected to the electronic equipment of the present invention, higher operability can be provided for the electronic equipment.

It goes without saying that, in the above-described second to fourth embodiments, the same effect as in the first embodiment is obtained.

As has been described above, electronic equipment of the present invention comprises: a primary power supplying circuit; a secondary power supplying circuit to which power is supplied from the primary power supplying circuit; a control circuit connected to the secondary power supplying circuit; a switch apparatus provided with a switch; and charge storage means connected between the control circuit and the switch apparatus, wherein the switch apparatus includes: an operation member for switching the switch between manual ON and OFF positions in which ON/OFF operations are manually performed, and an automatic ON/OFF position in which ON/OFF operations can be automatically performed; and a driving source for automatically operating the switch, wherein, in the automatic ON/OFF position, the driving source is driven by a signal from the control circuit or power supplied from the charge storage means to automatically turn the switch ON or OFF, whereby power to the primary power supplying circuit can be automatically supplied or shut off, and wherein the operation member is manually operated to turn the switch ON or OFF, whereby power to the primary power supplying circuit can be manually supplied or shut off. With this construction, if an automatic OFF operation is performed when the operation member is in the automatic ON/OFF position, power to the primary power supplying circuit can be shut off and standby power can be zeroed. When the operation member is manually positioned in the manual OFF position, since the switch can be turned OFF without accepting automatic ON/OFF operations, power to the primary power supplying circuit can be directly shut off by simple operations, based on the operator's will, ensuring that power consumption of the primary power supplying circuit at no use can be zeroed. When the operation member is positioned from the manual OFF position to the manual ON position, the switch can be turned ON without accepting automatic ON/OFF operations, ensuring that power can be supplied to the primary power supplying circuit, based on the operator's will.

The switch apparatus includes a driving member for turning the switch ON and OFF wherein the driving member is disposed so as to be freely engaged with and disengaged from the operation member; when the operation member is operated into the automatic ON/OFF position, the driving member is disengaged from the operation member so that the switch can be automatically turned ON and OFF by driving the driving member by the driving source; and when the operation member is operated into the manual ON or OFF position, the driving member is engaged with the operation member and is directly operated by the operation member to keep the switch ON or OFF and restrain the driving of the driving member by the driving source. With this construction, when the operation member is in the automatic ON/OFF position, the driving member can be driven independently of the operation member; in this case, driving force required to drive the driving member is minimum force for enabling switch ON or OFF operation, which is independent of the magnitude of force for operating the operation member. Therefore, the amount of power of power supplied to the driving source can be minimized, enabling efficient use of the charge storage means.

What is claimed is:

1. Electronic equipment comprising:

a primary power supplying circuit;

a secondary power supplying circuit to which power is supplied from the primary power supplying circuit;

a control circuit connected to the secondary power supplying circuit;

a switch apparatus provided with a switch; and charge storage means connected between the control circuit and the switch apparatus, wherein the switch apparatus includes:

an operation member for switching the switch between manual ON and OFF positions in which ON/OFF operations are manually performed, and an automatic ON/OFF position in which ON/OFF operations can be automatically performed; and a driving source for automatically operating the switch, wherein, when the operation member is operated into the automatic ON/OFF position, the driving source is driven by a signal from the control circuit or power supplied from the charge storage means to automatically turn the switch ON or OFF, whereby power to the primary power supplying circuit can be automatically supplied or shut off, and wherein the operation member is operated into the manual ON or OFF position to directly turn the switch ON or OFF, whereby power to the primary power supplying circuit can be manually supplied or shut off.

2. Electronic equipment according to claim 1, wherein:

the switch apparatus includes a driving member for turning the switch ON and OFF wherein the driving member is disposed so as to be freely engaged with and disengaged from the operation member;

when the operation member is operated into the automatic ON/OFF position, the driving member is disengaged from the operation member so that the switch can be automatically turned ON and OFF by driving the driving member by the driving source; and when the operation member is operated into the manual ON or OFF position, the driving member is engaged with the operation member and is directly operated by the operation member to keep the switch ON or OFF and restrain the driving of the driving member by the driving source.

* * * * *